US009213919B2

(12) United States Patent
Lin et al.

(10) Patent No.: US 9,213,919 B2
(45) Date of Patent: Dec. 15, 2015

(54) CATEGORY HISTOGRAM IMAGE REPRESENTATION

(71) Applicant: Adobe Systems Incorporated, San Jose, CA (US)

(72) Inventors: Zhe Lin, Fremont, CA (US); Radomir Mech, Mountain View, CA (US); Xiaohui Shen, San Jose, CA (US); Chen Fang, Hanover, NH (US)

(73) Assignee: Adobe Systems Incorporated, San Jose, CA (US)

( * ) Notice: Subject to any disclaimer, the term of this patent is extended or adjusted under 35 U.S.C. 154(b) by 100 days.

(21) Appl. No.: 14/180,305

(22) Filed: Feb. 13, 2014

(65) Prior Publication Data

US 2015/0227817 A1    Aug. 13, 2015

(51) Int. Cl.
G06K 9/00    (2006.01)
G06K 9/62    (2006.01)
G06K 9/46    (2006.01)

(52) U.S. Cl.
CPC ............ *G06K 9/6212* (2013.01); *G06K 9/4642* (2013.01); *G06K 2009/6213* (2013.01)

(58) Field of Classification Search
CPC . G06K 9/00; G06K 9/00335; G06K 9/00442; G06K 9/00463; G06K 9/00597; G06K 9/00664; G06K 9/00852; G06K 9/00859; G06K 9/186; G06K 9/32; G06K 9/33; G06K 9/325; G06K 9/3283; G06K 9/34; G06K 9/4671; G06K 9/468; G06K 9/48; G06K 9/6206; G06K 9/6211; G06K 9/72; G06K 2209/01; G06K 2209/015; H04N 1/3873; G06T 7/0081; G06T 7/408; G06T 2207/10008; G06T 2207/10016; G06T 2207/20008; G06T 2207/20144; G06T 2207/30176; G06F 17/211; G06F 17/27

See application file for complete search history.

(56) References Cited

U.S. PATENT DOCUMENTS

| 6,470,094 | B1 * | 10/2002 | Lienhart et al. | 382/176 |
| 8,009,921 | B2 * | 8/2011 | Csurka | 382/228 |
| 8,559,671 | B2 * | 10/2013 | Milanfar et al. | 382/103 |
| 8,774,498 | B2 * | 7/2014 | de Campos et al. | 382/155 |
| 2014/0254922 | A1 * | 9/2014 | Wang et al. | 382/159 |

OTHER PUBLICATIONS

Felzenszwalb, et al., "Efficient Graph-Based Image Segmentation", International Journal of Computer Vision 59(2), Sep. 17, 2003, 16 pages.
Shen, et al., "Object Retrieval and Localization with Spatially-Constrained Similarity Measure and k-NN Re-Ranking", IEEE Conference on Computer Vision and Pattern Recognition (CVPR), Jun. 16-21, 2012, Jun. 16, 2012, 8 pages.

* cited by examiner

*Primary Examiner* — Jose Couso
(74) *Attorney, Agent, or Firm* — Wolfe-SBMC (57) ABSTRACT

In techniques for category histogram image representation, image segments of an input image are generated and bounding boxes are selected that each represent a region of the input image, where each of the bounding boxes include image segments of the input image. A saliency map of the input image can also be generated. A bounding box is applied as a query on an images database to determine database image regions that match the region of the input image represented by the bounding box. The query can be augmented based on saliency detection of the input image region that is represented by the bounding box, and a query result is a ranked list of the database image regions. A category histogram for the region of the input image is then generated based on category labels of each of the database image regions that match the input image region.

20 Claims, 5 Drawing Sheets

CATEGORY HISTOGRAM IMAGE REPRESENTATION

BACKGROUND

Image descriptors, also referred to as visual descriptors, are utilized to identify and describe the visual features and objects in digital images and video. Well-defined and accurate image descriptors are the foundation of many computer vision-related tasks, such as image retrieval, image recognition, and object localization. In some aspects, image descriptors form the representation between the pixels of a digital image and the viewable features and objects that a viewer may observe in the digital image. Computer imaging systems rely heavily on the quality of the image descriptors in an image for the various image processing techniques.

SUMMARY

This Summary introduces features and concepts of category histogram image representation, which is further described below in the Detailed Description and/or shown in the Figures. This Summary should not be considered to describe essential features of the claimed subject matter, nor used to determine or limit the scope of the claimed subject matter.

Category histogram image representation is described. In embodiments, image segments of an input image are generated utilizing an image segmentation technique that over-segments the input image based on appearance features of the input image. Bounding boxes that each represent a region of the input image are then selected, where each of the bounding boxes include image segments of the input image and the bounding boxes are selected based on a clustering technique applied to cluster similar, neighboring ones of the image segments. A saliency map of the input image can also be generated. A bounding box is applied as a query on an images database to determine database image regions that match the region of the input image represented by the bounding box. The query can also be augmented based on saliency detection of the input image region that is represented by the bounding box. A query result is received as a ranked list of the database image regions that match the region of the input image based on a visual similarity. A category histogram for the region of the input image is then generated based on category labels of each of the database image regions that match the input image region. The category histogram for the input image region represents a probability distribution that the region is correctly labeled in the input image.

In implementations, a boundary of the region of the input image that is represented by the bounding box can be refined in the image based on segmentation boundaries of the respective database image regions that match the region of the input image. A representative category label of the input image region can be voted based on the category histogram that is generated for the input image region. Additionally, the voting can be based on the segmentation boundaries of the respective database image regions that match the region of the input image. In implementations, the operations can be repeated for each bounding box that represents a respective region of the input image, such as to apply the bounding box as a query on the images database with the query augmented based on the saliency detection of the input image region; receive a query result of the database image regions that match the region of the input image; and generate a category histogram for the region of the input image based on the category labels of each of the database image regions that match the input image region.

BRIEF DESCRIPTION OF THE DRAWINGS

Embodiments of category histogram image representation are described with reference to the following Figures. The same numbers may be used throughout to reference like features and components that are shown in the Figures.

DETAILED DESCRIPTION

Embodiments of category histogram image representation are described as techniques to determine category labels of the features and objects that may be viewable in a digital image, referred to herein as the input image. For example, an input image may be any digital photo that includes people, animals, buildings, landscape items, vehicles, a background region, and/or any other features and objects. Given an input image, embodiments of category histogram image representation are implemented to identify and label the features and objects of the input image. The features and objects of the input image are segmented and clustered into image regions, and a category histogram is generated for each of the image regions, from which a category label of each region can be determined. The category labels of the features and objects in the input image may then be useful for other image processing applications, such as for image retrieval, image recognition, object localization and detection, image segmentation, and the like.

A category histogram for an image region of an input image is a high-level representation of the image region, and the category histogram is generated via image search and localization to determine category labels of the image region. The category histogram is a representation of the image region as derived via queries on a database of annotated images, referred to herein as the images database, and from which database image regions that match the region of the input image are determined. The images database is a fully segmented and labeled image database, and given an input image, regions of the image are issued as queries to an image search system that runs on the images database for the retrieval-based technique to represent the image. The category label information of the top returned results are received, from which the categorical information of the different image regions can be inferred, and each image region has a corresponding category histogram that represents the probability distribution of belonging to each category. Image classification of the input image can also be determined simply by taking an average of all of the category histograms for each of the image regions in the overall input image.

While features and concepts of category histogram image representation can be implemented in any number of different devices, systems, networks, environments, and/or configurations, embodiments of category histogram image representation are described in the context of the following example devices, systems, and methods.

Figure 1:
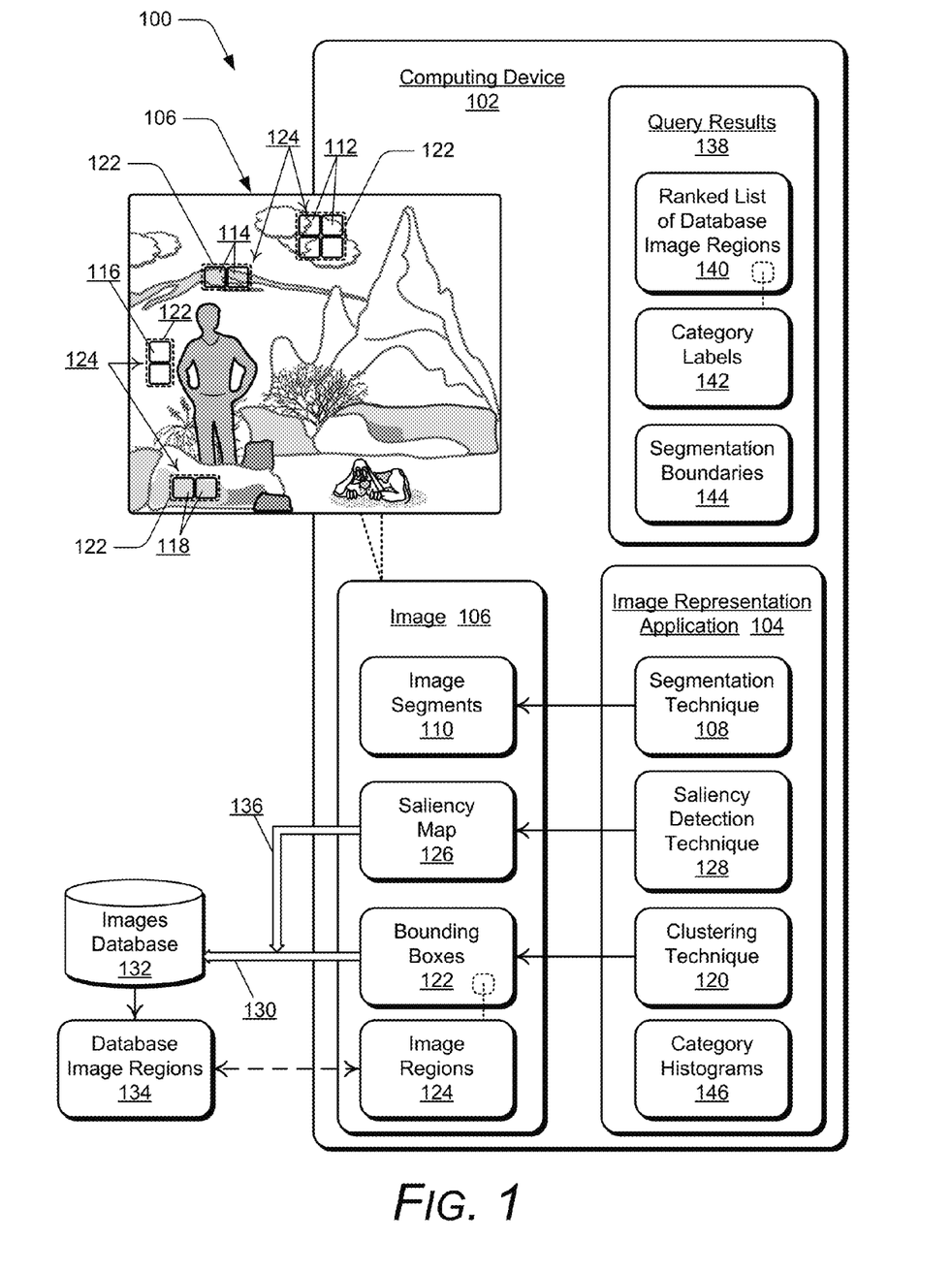
FIG. 1 illustrates an example of a computing device that implements an image representation application in accordance with one or more embodiments of category histogram image representation.

FIG. 1 illustrates an example 100 of a computing device 102 that implements an image representation application 104 in embodiments of category histogram image representation. An image 106 can be any type of digital image, which can be displayed on a display device of a computing system or device. The image 106 can be displayed on any type of display device that is connected to, or integrated with, the computing device 102, such as any type of computer, mobile phone, tablet device, digital camera, or any other electronic media device that implements the image representation application 104 (e.g., a software application) in embodiments of category histogram image representation. The image 106 is also referred to herein as an input image, such as a digital image that is an input to the computing device or to a computing system for any type of digital processing. The input image can include varying features, objects, segments, and regions of the image, and as described herein, the regions of the input image 106 can identified with category labels based on category histograms that are developed for each of the respective regions of the image.

In implementations, the image representation application 104 is implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 5.

In embodiments, the image representation application 104 implements an image segmentation technique 108 to generate image segments 110 of the input image 106. In implementations, the image segmentation technique over-segments the input image based on appearance features of the image I, and a set S(I) of segments of the input image 106 is denoted as $S(I)=\{s_1, s_2, \ldots, s_{m-1}, s_m\}$. Any type of image segmentation technique 108 may be utilized in embodiments of category histogram image representation, such as *Efficient Graph-Based Image Segmentation* described by Felzenszwalb et al. (International Journal of Computer Vision, Volume 59, Number 2, September 2004). The example input image 106 includes various examples of the image segments 110, such as the image segments 112 of the clouds, image segments 114 of the mountain, image segments 116 of the image background, and image segments 118 of the rock features. These various examples of the image segments are merely for illustrative and discussion purposes with reference to the input image 106. In implementations, all of the input image 106 is over-segmented to generate the image segments 110 of the input image.

The image representation application 104 also implements a clustering technique 120 to select bounding boxes 122 that each represent an image region 124 of the input image 106. For each $s_i \in S(I)$ segment set, the centroid $c_i$ is computed as the mean of the coordinates of all pixels in $s_i$. Then the set S(I) of segments is partitioned into u clusters by running a k-means on $C(I)=\{c_1, c_2, \ldots, c_m\}$. The clusters are denoted as $P_1(I)=\{p_1^1, p_2^1, \ldots, p_{u-1}^1, p_u^1\}$. The query set is generated by assigning a bounding box for each cluster $p_i^1$, which includes every pixel that falls into $p_i$. This set of appearance based queries is denoted as $Q_1(I)=\{q_1^1, q_2^1, \ldots, q_{u-1}^1, q_u^1\}$. Any clustering technique 120 may be implemented on the image segments, such that neighboring segments are grouped together as a cluster. The bounding boxes are shown in the example of the input image 106 as dashed-line boxes around groups of the image segments, where each of the bounding boxes include one or more of the image segments and are selected based on the clustering technique 120 that is applied to cluster similar, neighboring ones of the image segments.

In implementations, the image representation application 104 generates a saliency map 126 of the input image 106 utilizing a saliency detection technique 128. The saliency map 126 represents the visual saliency of an image scene, and the most prominent, relevant, and/or noticeable regions of the image 106 are the salient image regions that can be determined based on various contributing components, such as motion, intensity, orientation, color, region boundaries, etc. For each $s_i \in S(I)$, besides calculating clusters $c_i$, its saliency value $sal_i$ is computed as the mean of saliency value of all pixels that fall into $s_i$. Then the set S(I) of segments is partitioned into v clusters by running a k-means on the concatenation of $c_i$ and $sal_i$. This clustering attempts to group neighboring segments with similar saliency together. The corresponding clusters and query set are denoted as $P_2(I)=\{p_1^2, p_2^2, \ldots, p_{v-1}^2, p_v^2\}$ and $Q_2(I)=\{q_1^2, q_2^2, \ldots, q_{v-1}^2, q_v^2\}$, respectively. Compared with the segmented image regions 124 that are based on appearance and may not capture small, but important objects in the image, the saliency detection is more sensitive to saliency of the image regions, so as to ensure that there will be queries that are dominated by small but salient objects in the input image. An example of the saliency map 126 is shown and described with reference to FIG. 2.

The image representation application 104 is implemented to apply the bounding boxes 122 and saliency detection as queries 130 (e.g., merged query sets Q1 and Q2) on an images database 132 to determine database image regions 134 that match the respective image regions 124 that are represented by the bounding boxes 122. The images database 132 includes images that are already labeled and segmented, where each segment has a semantic, category label that identifies the feature or object of the image segment. Given the two appearance-based and saliency-guided queries, the image representation application 104 implements an image retrieval technique to retrieve the visually similar, database image regions 134 in the images database 132. For each image region 124 of the input image 106, the corresponding bounding box 122 and saliency detection is applied as a query 130 on the images database 132 to determine the database image regions 134 that match the image region 124 represented by the corresponding bounding box. In embodiments, the queries 130 on the images database 132 can be augmented at 136 based on the saliency detection of the image regions 124 in the saliency map 126 of the image 106.

Given the two query sets $Q_1(I)$ and $Q_2(I)$, the image representation application 104 can implement the image retrieval technique for *Object Retrieval and Localization with Spatially-Constrained Similarity Measure and k-NN Reranking* described by Shen et al. (IEEE Conference on Computer Vision and Pattern Recognition (CVPR), 2012). This image retrieval technique is further described below, after the description of FIG. 3. The returned query results of the database image regions can be ranked by similarity in descending order. For example, the $k^{th}$ image on the search result of the $j^{th}$ query in query set $Q_i$, is notated as $R_{ijk}=(id, x_m in, x_m ax, y_m in, y_m ax)$, which contains the id in D and 2D coordinate ranges.

In response to each of the queries 130 on the images database 132, the image representation application 104 receives a query result 138 of the database image regions 134, and in implementations, the query result is a ranked list 140 of the database image regions 134 that match the image region 124 based on a visual similarity. A query result 138 for a query 130 also includes category labels 142 for each of the database image regions 134. A category label 142 identifies a database image region, such as an image segment that represents a feature or object in one or more of the images in the images database. A query result 138 for a query 130 can also include segmentation boundaries 144 of the respective database image regions 134 that match the region 124 of the input image 106. The image representation application 104 can be implemented to refine the boundary of an image region 124 that is represented by a corresponding bounding box 122 based on the segmentation boundaries 144 of the respective database image regions 134 that match the region 124 of the input image.

The image representation application 104 is implemented to match the query results 138 to the respective bounding boxes 122. Given a query q and a return bounding box r on the input image 106, a mapping function $f: (i, j) \rightarrow (i, j)$ is used to map every pixel in q to r, so that a category label in r can be transferred to q at pixel level. The same operation can be performed for each query 130 and each of the returned image bounding boxes 122, such that each pixel in the input image 106 will be assigned with different category labels multiple times.

The image representation application 104 is implemented to generate a category histogram 146 for each of the image regions 124 based on the received query results 138. An example of the category histogram 146 is shown and described with reference to FIG. 2. A category histogram 146 for an image region 124 represents the probability of a respective image region 124 belonging to different categories. Accordingly, for each segment $s_i$ or even the entire input image, the category histogram is the normalized mean of all histograms of its pixels. The image representation application 104 is also implemented to vote for a representative category label of an image region 124 based on the category histogram 146 that is generated for the image region of the input image. Additionally, the voting can be based on the segmentation boundaries 144 of the respective database image regions 134 that match the region of the input image.

Figure 2:
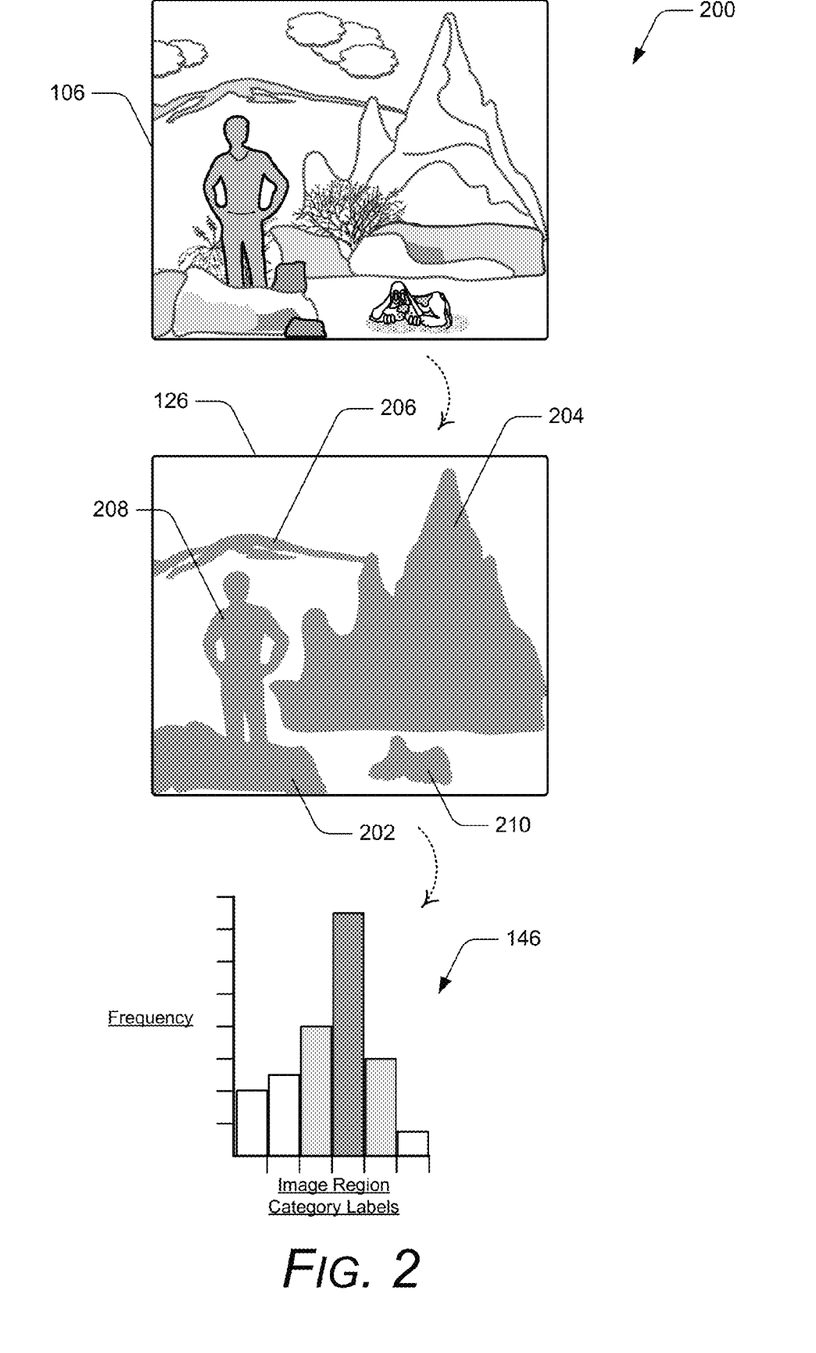
FIG. 2 illustrates an example of an image saliency map and representation of a category histogram for image region category labels in accordance with one or more embodiments of category histogram image representation.

FIG. 2 illustrates an example 200 of the saliency map 126 that represents the visual saliency of the image 106, and includes the most prominent, relevant, and/or noticeable regions of the image are the salient image regions. The more salient image regions in the image 106 include the foreground rocks 202, the rock peak 204, the background mountains 206, the person 208, and the dog 210. The segmented regions are clearly partitioned or defined in the saliency map. An image region of the image 106 may be represented by the salient image regions (e.g., of multiple pixels) and/or by the bounding boxes 122 that each represent an image region 124 of the input image 106, as shown and described with reference to FIG. 1. The image representation application 104 applies the bounding boxes 122 and saliency detection as the queries on the images database 132 to determine the database image regions 134 that match the respective image regions 124 that are represented by the bounding boxes 122.

The image representation application 104 receives the query result 138 of the database image regions 134, and in implementations, the query result is a ranked list 140 of the database image regions 134 that match an image region 124 based on a visual similarity. A query result 138 for a query 130 also includes category labels 142 for each of the database image regions 134, where a category label 142 identifies a database image region, such as an image segment that represents a feature or object in one or more of the images in the images database. The image representation application 104 generates the category histogram 146 for each of the image regions 124 based on the received query results 138, and the category histogram for an image region represents the probability of a respective image region belonging to different categories. For each segment, or even the overall image, the category histogram 146 can be represented as the normalized mean of all histograms of the image pixels.

Example method 300 is described with reference to FIG. 3 in accordance with one or more embodiments of category histogram image representation. Generally, any of the services, components, modules, methods, and operations described herein can be implemented using software, firmware, hardware (e.g., fixed logic circuitry), manual processing, or any combination thereof. The example method may be described in the general context of executable instructions stored on a computer-readable storage memory that is local and/or remote to a computer processing system, and implementations can include software applications, programs, functions, and the like.

Figure 3:
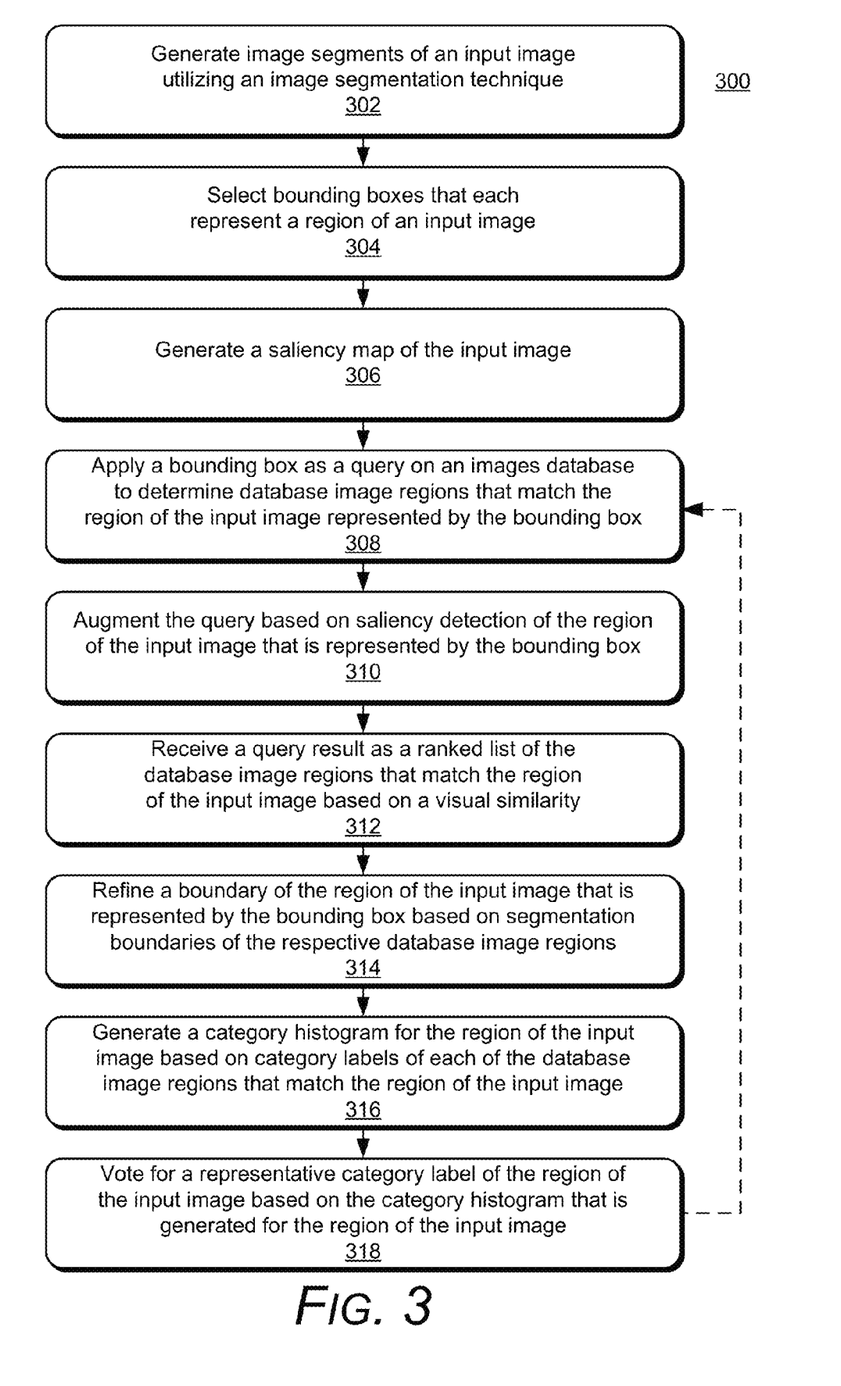
FIG. 3 illustrates example method(s) of category histogram image representation in accordance with one or more embodiments.

FIG. 3 illustrates example method(s) 300 of category histogram image representation, and is generally described with reference to an image representation application implemented by a computing device. The order in which the method is described is not intended to be construed as a limitation, and any number or combination of the method operations can be combined in any order to implement a method, or an alternate method.

At 302, image segments of an input image are generated utilizing an image segmentation technique. For example, the image representation application 104 (FIG. 1) that is implemented by the computing device 102 (or implemented at a cloud-based data service as described with reference to FIG. 4) generates the image segments 110 of the input image 106 utilizing an image segmentation technique 108. As described above, the image segmentation technique over-segments the input image based on appearance features of the input image.

At 304, bounding boxes are selected that each represent a region of an input image. For example, the image representation application 104 selects the bounding boxes 122 that each represent a region 124 of the input image 106, where each of the bounding boxes includes one or more of the image segments 110 of the input image. As described above, the bounding boxes 122 that each represent an image region 124 can be selected based on a clustering technique 120 applied to cluster similar, neighboring ones of the image segments.

At 306, a saliency map of the input image is generated. For example, the image representation application 104 generates the saliency map 126 of the input image 106, where the saliency map represents the visual saliency of an image scene (e.g., of the input image), and the most prominent, relevant, and/or noticeable regions of the image 106 are the salient image regions that can be determined.

At 308, a bounding box is applied as a query on an images database to determine database image regions that match the region of the input image represented by the bounding box. For example, the image representation application 104 applies a bounding box 122 as a query 130 on the images database 132 to determine the database image regions 134 that match the region 124 of the input image 106 that is represented by the bounding box.

At 310, the query is augmented based on saliency detection of the region of the input image that is represented by the bounding box. For example, the image representation application 104 augments the query 130 based on the saliency detection (i.e., from the saliency map 126) of the image region 124 of the input image 106 that is represented by the bounding box.

At 312, a query result is received as a ranked list of the database image regions that match the region of the input image based on a visual similarity. For example, the image representation application 104 receives the query result 138 as a ranked list 140 of the database image regions 134 that match the region 124 of the input image 106 based on a visual similarity. As described above, a query result 138 for a query 130 also includes the category labels 142 for each of the database image regions 134, where a category label 142 identifies a database image region. A query result 138 for a query 130 can also include the segmentation boundaries 144 of the respective database image regions 134 that match the region 124 of the input image 106.

At 314, a boundary of the input image region that is represented by the bounding box is refined based on segmentation boundaries of the respective database image regions that match the region of the input image. For example, the image representation application 104 receives the query result 138 of the database image regions 134 that includes the segmentation boundaries 144 of the database image regions, and the boundary of an input image region 124 that is represented by a respective bounding box 122 is refined based on the segmentation boundaries of the respective database image regions that match the region of the input image.

At 316, a category histogram for the region of the input image is generated based on category labels of each of the database image regions that match the region of the input image. For example, the image representation application 104 generates the category histogram 146 for the image region 124 of the input image 106 based on the category labels of 142 the database image regions 134 that match the image region 124 of the input image. The category histogram 146 for the input image region represents a probability distribution that the region is correctly labeled in the input image with a category label.

At 318, a representative category label of the region of the input image is voted based on the category histogram that is generated for the region of the input image. For example, the image representation application 104 votes for a representative one of the category labels 142 for the image region 124 of the input image based on the category histogram 146 of the category labels for all of the database image regions 134 that correspond to a particular image region 124 of the input image. The image representation application 104 can also base the voting on the segmentation boundaries 144 of the respective database image regions 134 that match the image region of the input image.

The method can then continue at 308 to repeat the operations for each bounding box 122 that represents a different image region 124 of the input image 106. For example, each bounding box 122 is applied as a query 130 on the images database 132 (at 308), and the query can be augmented at 136 based on the saliency detection of the image region that is represented by the bounding box (at 310). Additionally, the query result 138 is received for each query (at 312), and the boundary of the input image region 124 can be refined based on the segmentation boundaries 144 of the database image regions 134 (at 314). Further, the category histogram 146 is generated for the respective region 124 of the input image (at 316), and a representative category label of the region is voted based on the category histogram from the corresponding category labels 142 for all of the database image regions 134 that correspond to a particular image region 124 of the input image.

Image Retrieval: As described above, the image representation application 104 can implement the image retrieval technique for *Object Retrieval and Localization with Spatially-Constrained Similarity Measure and k-NN Reranking* described by Shen et al. (IEEE Conference on Computer Vision and Pattern Recognition (CVPR), 2012). A spatially constrained similarity measure (SCSM) is implemented to handle object rotation, scaling, view point change and appearance deformation. The similarity measure is efficiently calculated by a voting-based method using inverted files. Object retrieval and localization are then simultaneously achieved without post-processing.

A database image is similar to a query image if it is also similar to the nearest neighbors of a query. An image that contains the query object may not be visually close to the query due to feature variations caused by view point change, occlusion or deformation. However, some of query's neighbors, which can be considered as variations of the query object, may share the same features with that image. Therefore, the re-ranking method with the k-nearest neighbors (k-NN) of the query is utilized. After the initial search, localized objects in the top-k retrieved images are also used as queries to perform a search. A database image will have different ranks when using those neighbors as queries. Accordingly a new score of each database image is collaboratively determined by those ranks, and re-ranking is performed using the new scores.

The retrieval technique is rank-order based, which discards the features and their distances when measuring the score. Therefore, it can successfully retrieve the objects with large variations, while avoiding degradation when there are irrelevant objects in the k-nearest neighbors. The retrieval technique utilizes a spatially-constrained similarity measure; a voting-based approach to evaluate the similarity measure that simultaneously, and efficiently, retrieves and localizes the object in the database images; and a re-ranking method with the k-nearest neighbors of the query.

Spatially Constrained Similarity Measure: Given a query image (e.g., the input image 106) with a specified object, the spatial information of the object can be represented by a rectangle $B=\{x_c, y_c, w, h, \theta\}$, where $\{x_c, y_c\}$ is the coordinate of the rectangle center, w and h are the width and height of the rectangle respectively, and $\theta$ is the rotated angle of the rectangle ($\theta=0$ for the query rectangle). The image representation application 104 locates the same object with certain similarity transformation T in a database image (e.g., included in the images database 132). The similarity transformation T can be decomposed into three parameters $T=\{R(\alpha),s,t\}$, where $\alpha$ is the rotated angle of the object and $R(\alpha)=[_{sin\,\alpha\,cos\,\alpha}^{cos\,\alpha-sin\,\alpha}]$, is the scale change, and $t=\{x_t, y_t\}$ is the translation. Accordingly, the transformed object rectangle in the database image would be $B'=T(B)=\{x_c+x_t, y_c+y_t, s\cdot w, s\cdot h, \theta=\alpha\}$.

By the above definition, the task becomes (1) evaluating the similarity between the query object and a database image by finding a transformed sub-rectangle in the database image which best matches to the query object; and (2) sorting the database images based on the similarity. To achieve this, the spatially constrained similarity measure (SCSM) is defined. The object rectangle in the query is denoted by Q, and the features are extracted from Q by $\{f_1, f_2, \ldots, f_m\}$. Similarly, the database image is denoted by D, and the features in D denoted by $\{g_1, g_2, \ldots, g_n\}$. Given a transformation T, the similarity between Q and D is defined in EQ(1) as:

$$S(Q, D \mid T) = \sum_{k=1}^{N} \sum_{\substack{(f_i, g_j) \\ f_i \in Q, g_j \in D \\ w(f_i) = w(g_j) = k \\ \|T(L(f_i)) - L(g_j)\| < \epsilon}} \frac{idf^2(k)}{tf_Q(k) \cdot tf_D(k)}$$

where k denotes the k-th visual word in the vocabulary, and N is the vocabulary size. The $w(f_i)=w(g_j)=k$ means that $f_i$ and $g_j$ are both assigned to visual word k. The $L(f)=(x_f, y_f)$ is the 2D image location of f and $T(L(f))$ is its location in D after the transformation. The spatial constraint $\|T(L(f_i))-L(g_j)\|<\epsilon$ means that after transformation, the locations of two matched features should be sufficiently close.

In the EQ(1) above, idf(k) is the inverse document frequency of the visual word k, and $tf_Q(k)$ is the term frequency (i.e., number of occurrence) of visual word k in Q. Similarly, $tf_D(k)$ is the term frequency of visual word k in D. This is a normalization term to penalize those visual words repeatedly appearing in the same image. When repeated patterns (e.g., building facades, windows, and water waves) exist in an image, many features tend to be assigned to the same visual word. For example, if m features in Q and n features in D are quantized to visual word k respectively, there will be m·n matched pairs between two images, some of which may also satisfy the spatial constraint, as they tend to appear in a local neighborhood. However, if features are directly matched without quantization, there should be at most min(m, n) matched pairs. In other words, most of these m·n pairs are invalid correspondences and would largely bias the similarity measure if no normalization is applied. For each database image, the goal is to find the transformation with the highest similarity, i.e., as in EQ(2):

$$T^* = \{R(\alpha^*), s^*, t^*\} = \mathrm{argmax}_T S(Q, D \mid T)$$

As a result, $S^*(Q, D)=S(Q, D|T^*)$ can serve as the similarity between Q and D. All the database images are then ranked according to $S^*(Q, D)$. A similarity measure is $w(f_i)=w(g_i)$, but only $\{(f_i, g_i)(i=1,2,3)\}$ are spatially consistent with the transformation. The $(f_s, g_s)$ can be considered as a false match, and $(f_4, g_4)$ depends on the selection of the tolerance parameter $\epsilon$ in EQ(1). If a relatively large object deformation is allowed and $\epsilon$ is set higher, the $(f_4, g_4)$ is considered as inliners, otherwise it is also excluded.

Optimization of the Similarity Measure: In order to evaluate $S^*(Q, D)$, the transformation $T^*$ is determined that maximizes the similarity score. In lieu of a practical method to search for the true optimum, an approximation is based on discretizing the transformation space, which is decomposed into rotation, scaling, and translation. First the rotation angle space is quantized to $n_R$ values between $0 \sim 2\pi$ (typically $n_R=4$ or 8). Similarly, the scale space is also discretized to $n_s$ values (typically $n_s=8$ in a range from ½ to 2, which generally covers most cases. These discretizations yield a set of possible transformation hypotheses (up to translation). The query object is then transformed based on each hypothesis, while keeping the location of the rectangle center the same (i.e., no translation). To perform the transformation, only the relative locations of all the query features with respect to the center need to be re-calculated.

After the query rectangle is transformed to a particular quantized rotation angle and scale, a voting scheme is used to find the best translation. Consider a matched pair (f, g) between Q and D. Denote by V(f) the relative location vector from the rotated and scaled location of f to the rectangle center $c_Q$. The (f, g) can determine a translation based on their locations, and this translation enforces the possible location of the rectangle center in D to be $L(c_D)=L(g)-V(f)$. Therefore, given a matched pair, the location of the rectangle center in D can be found, and vote a score for that location. If $w(f)=w(g)=k$, the voting score for the pair (f, g) is defined as in EQ(3):

$$\mathrm{Score}(k) = \frac{idf^2(k)}{tf_Q(k) \cdot tf_D(k)}$$

If some matched feature pairs are spatially consistent, then the center locations they are voting should be similar. The cumulative votes of matched features (f, g) generate a voting map, in which each location represents a possible new object center associated with a certain translation t. When votes are cast using the EQ(3), the accumulated score at each location is exactly the similarity measure S(Q, D|T) in the EQ(1). The best translation t* is chosen by simply selecting the mode in the voting map.

As noted before voting, the query has been transformed to $n_R$ rotation angles and $n_s$ scales. Therefore there are $n_R \cdot n_s$ voting maps in total. The best transformation T* is achieved by finding the location with the highest score in all voting maps. Meanwhile the best score naturally serves as the similarity between the query and the database image, which is subsequently used for ranking. This scheme allows to simultaneously achieve object retrieval and localization without a sub-window search or post-processing.

In practice, when the objects are mostly upright, rotation can be switched off. When generating the voting map, a map with a much smaller size can be maintained compared to the images, by quantizing the map to $n_x \times n_y$ grids. To avoid quantization errors and allow object deformation, instead of voting on one grid, a vote is implemented on a 5×5 window around the estimated center grid for each matched pair. The voting score of each grid is the initial Score(k) in the EQ(3) multiplied by a Gaussian weight $\exp(-d/\sigma^2)$, where d is the distance of the grid to the center. This has the effect of spatially smoothing the votes and is equivalent to generating a single vote and smoothing with a Gaussian filter afterwards.

Similarity Evaluation using Inverted Files: To calculate the spatially-constrained similarity measure and determine the best transformation, the locations (e.g., X- and Y-coordinates) of the features are stored in the inverted files. When calculating the voting map, the general retrieval framework is followed (i.e., for each word k in the query, the image IDs and locations of k are retrieved in these images through the inverted files). Object center locations and scores are then determined by the EQ(3), and votes are cast on corresponding voting maps.

There are two ways to consider rotation and scale change in the search process. One way is to allocate $n_R \cdot n_s$ voting maps at each search round. When traversing the inverted files, a vote is implemented on all those maps. Therefore the inverted files are only traversed once. Another way is to sequentially generate voting maps for each quantized rotation and scale value. Therefore only one voting map is maintained for each database image. However, the implementation needs to retrieve $n_R \cdot n_s$ times. To make a trade-off between search time and memory in practice, a search is performed for each quantized rotation step, and $n_s$ voting maps are generated with different scales in each search process. In that case, $n_s$ voting maps are maintained for each image, and the search performed $n_R$ times.

Figure 4:
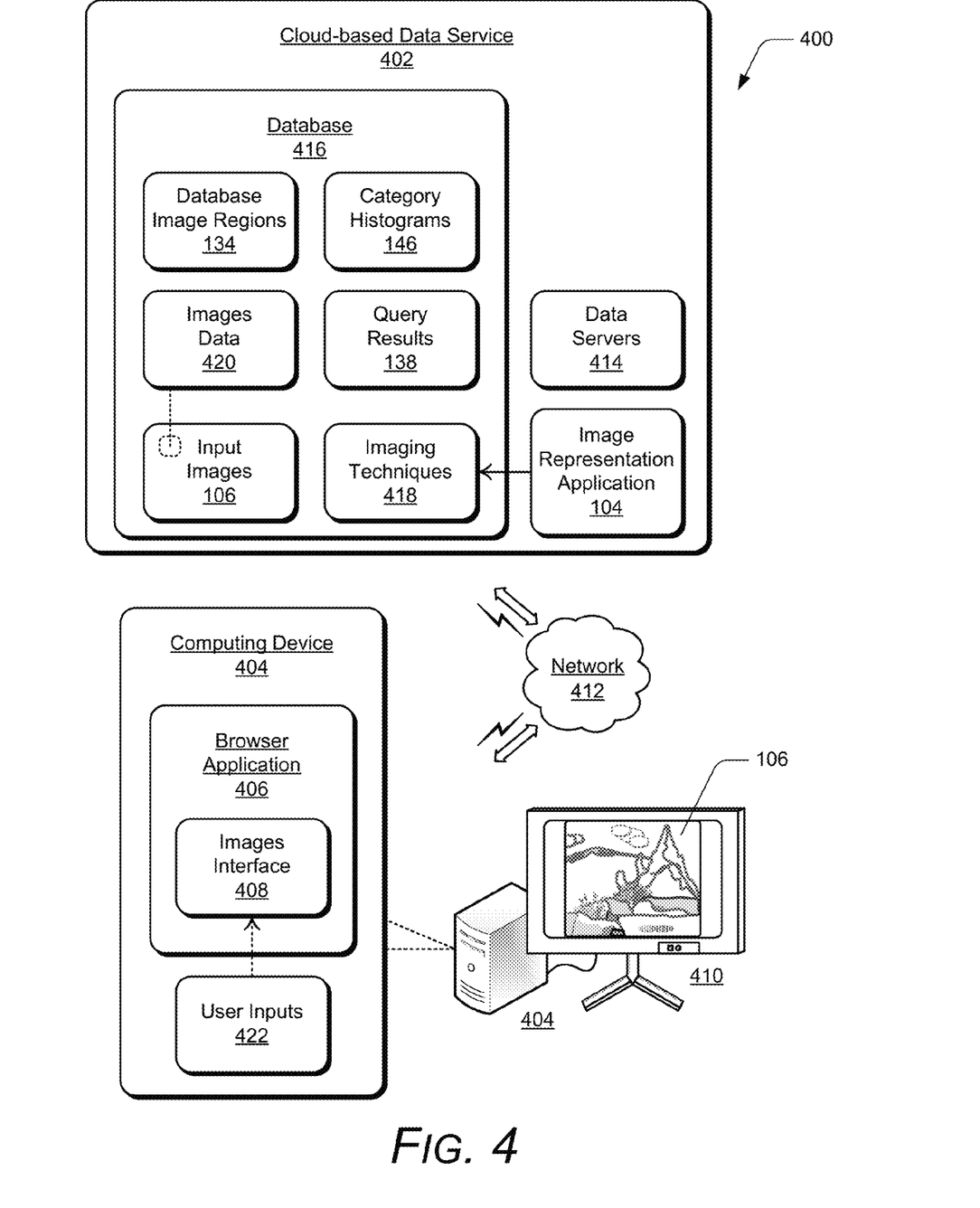
FIG. 4 illustrates an example system in which embodiments of category histogram image representation can be implemented.

FIG. 4 illustrates an example system 400 in which embodiments of category histogram image representation can be implemented. The example system 400 includes a cloud-based data service 402 that a user can access via a computing device 404, such as any type of computer, mobile phone, tablet device, and/or other type of computing device. The computing device 404 can be implemented with a browser application 406 through which a user can access the data service 402 and initiate a display of an images interface 408 to display images, such as the image 106 also shown on a display device 410 that is connected to the computing device. The computing device 404 can be implemented with various components, such as a processing system and memory, and with any number and combination of differing components as further described with reference to the example device shown in FIG. 5.

In embodiments of category histogram image representation, the cloud-based data service 402 is an example of a network service that provides an on-line, Web-based version of the image representation application 104 that a user can log into from the computing device 404 and display the images interface 408. The network service may be utilized for any type of image editing and processing, to include illustration editing, video compositing and editing, graphics and page layouts, animation, and any other type of application user interface. The data service can also maintain and/or upload an input image (e.g., the input images 106) that is displayable in the images interface 408.

Any of the devices, data servers, and networked services described herein can communicate via a network 412, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 402 includes data servers 414 that may be implemented as any suitable memory, memory device, or electronic data storage for network-based data storage, and the data servers communicate data to computing devices via the network 412. The data servers 414 maintain a database 416 of the input images 106, as well as the imaging techniques 418 that are implemented by the image representation application 104. The imaging techniques 418 may include any one or combination of the segmentation technique 108, the clustering technique 120, and the saliency detection technique 128 as described with reference to FIG. 1. The database 416 can also include the images data 420, such as the image segments 110, the bounding boxes 122 that represent the image regions 124, and the saliency map 126 of an input image. The database 416 also includes the query results 138, the category histograms 146, and the database image regions 134 determined from the images database 132, which may be located with the cloud-based data service 402, or remote from the data service.

The cloud-based data service 402 includes the image representation application 104, such as a software application (e.g., executable instructions) that is executable with a processing system to implement embodiments of category histogram image representation. The image representation application 104 can be stored on a computer-readable storage memory, such as any suitable memory, storage device, or electronic data storage implemented by the data servers 414. Further, the data service 402 can include any server devices and applications, and can be implemented with various components, such as a processing system and memory, as well as with any number and combination of differing components as further described with reference to the example device shown in FIG. 5.

The data service 402 communicates the images data 420 and the images interface 408 of the image representation application 104 to the computing device 404 where the images interface is displayed, such as through the browser application 406 and displayed on the display device 410 of the computing device. The image representation application 104 can also receive user inputs 422 to the images interface 408, such as when a user at the computing device 404 initiates a user input with a computer input device or as a touch input on a touchscreen to initiate category labeling in an image. The computing device 404 communicates the user inputs 422 to the data service 402 via the network 412, where the image representation application 104 receives the user inputs.

Figure 5:
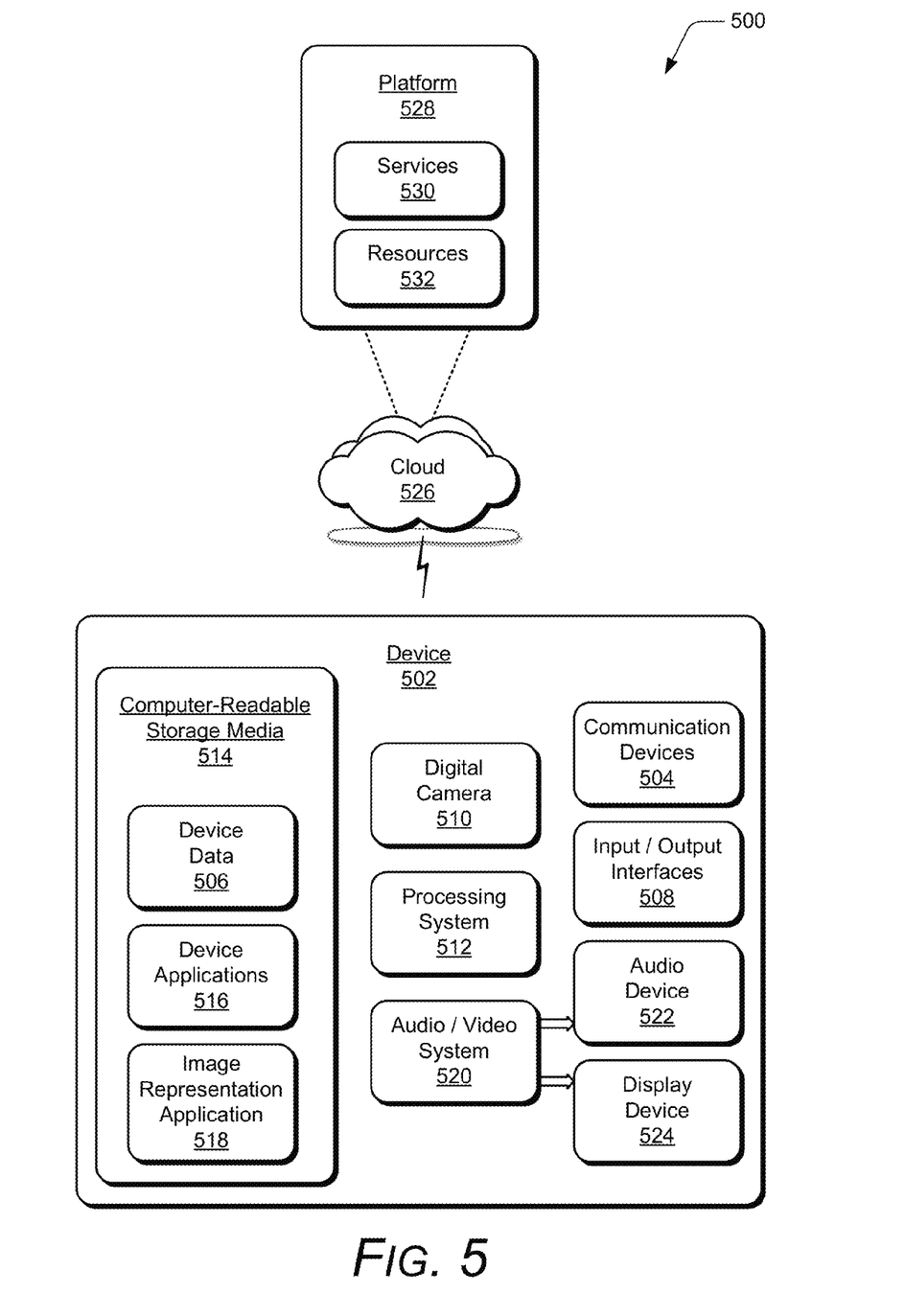
FIG. 5 illustrates an example system with an example device that can implement embodiments of category histogram image representation.

FIG. 5 illustrates an example system 500 that includes an example device 502, which can implement embodiments of category histogram image representation. The example device 502 can be implemented as any of the devices and/or server devices described with reference to the previous FIGS. 1-4, such as any type of client device, mobile phone, tablet, computing, communication, entertainment, gaming, media playback, digital camera, and/or other type of device. For example, the computing device 102 shown in FIG. 1, as well as the computing device 404 and the data service 402 (and any devices and data servers of the data service) shown in FIG. 4 may be implemented as the example device 502.

The device 502 includes communication devices 504 that enable wired and/or wireless communication of device data 506, such as user images and other associated image data. The device data can include any type of audio, video, and/or image data, as well as the input images. The communication devices 504 can also include transceivers for cellular phone communication and/or for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices, such as a digital camera device 510 and/or display device that may be integrated with the device 502. The I/O interfaces also include data input ports via which any type of data, media content, and/or inputs can be received, such as user inputs to the device, as well as any type of audio, video, and/or image data received from any content and/or data source.

The device 502 includes a processing system 512 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes computer-readable storage media 514, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 514 provides storage of the device data 506 and various device applications 516, such as an operating system that is maintained as a software application with the computer-readable storage media and executed by the processing system 512. In this example, the device applications also include an image representation application 518 that implements embodiments of category histogram image representation, such as when the example device 502 is implemented as the computing device 102 shown in FIG. 1, or as the data service 402 shown in FIG. 4. An example of the image representation application 518 includes the image representation application 104 implemented by the computing device 102 and/or at the data service 402, as described in the previous FIGS. 1-4.

The device 502 also includes an audio and/or video system 520 that generates audio data for an audio device 522 and/or generates display data for a display device 524. The audio device and/or the display device include any devices that process, display, and/or otherwise render audio, video, display, and/or image data, such as the image content of a digital photo. In implementations, the audio device and/or the display device are integrated components of the example device 502. Alternatively, the audio device and/or the display device are external, peripheral components to the example device.

In embodiments, at least part of the techniques described for category histogram image representation may be implemented in a distributed system, such as over a "cloud" 526 in a platform 528. The cloud 526 includes and/or is representative of the platform 528 for services 530 and/or resources 532. For example, the services 530 may include the data service 402 as described with reference to FIG. 4. Additionally, the resources 532 may include the image representation application 104 and/or the imaging techniques 418 that are implemented at the data service as described with reference to FIG. 4.

The platform 528 abstracts underlying functionality of hardware, such as server devices (e.g., included in the services 530) and/or software resources (e.g., included as the resources 532), and connects the example device 502 with other devices, servers, etc. The resources 532 may also include applications and/or data that can be utilized while computer processing is executed on servers that are remote from the example device 502. Additionally, the services 530 and/or the resources 532 may facilitate subscriber network services, such as over the Internet, a cellular network, or Wi-Fi network. The platform 528 may also serve to abstract and scale resources to service a demand for the resources 532 that are implemented via the platform, such as in an interconnected device embodiment with functionality distributed throughout the system 500. For example, the functionality may be implemented in part at the example device 502 as well as via the platform 528 that abstracts the functionality of the cloud 526.

Although embodiments of category histogram image representation have been described in language specific to features and/or methods, the appended claims are not necessarily limited to the specific features or methods described. Rather, the specific features and methods are disclosed as example implementations of category histogram image representation.

The invention claimed is:

1. A method, comprising:
   selecting bounding boxes that each represent a region of an input image, each of the bounding boxes comprising one or more image segments of the input image;
   generating a saliency map of the input image;
   applying a bounding box as a query on an images database to determine database image regions that match the region of the input image represented by the bounding box;
   augmenting the query on the images database based on saliency detection of the region of the input image that is represented by the bounding box;
   receiving a query result of the database image regions that match the region of the input image; and
   generating a category histogram for the region of the input image based on category labels of each of the database image regions that match the region of the input image.

2. The method as recited in claim 1, wherein the category histogram for the region of the input image represents a probability distribution that the region is correctly labeled in the input image.

3. The method as recited in claim 1, further comprising:
   receiving the query result as a ranked list of the database image regions that match the region of the input image based on a visual similarity.

4. The method as recited in claim 1, further comprising:
   generating the image segments of the input image utilizing an image segmentation technique that over-segments the input image based on appearance features of the input image.

5. The method as recited in claim 1, further comprising:
   voting for a representative category label of the region of the input image based on the category histogram that is said generated for the region of the input image.

6. The method as recited in claim 5, wherein said voting is additionally based on segmentation boundaries of the respective database image regions that match the region of the input image.

7. The method as recited in claim 6, further comprising:
   refining a boundary of the region of the input image that is represented by the bounding box based on the segmentation boundaries of the respective database image regions that match the region of the input image.

8. The method as recited in claim 1, wherein said selecting the bounding boxes that each represent a region of the input image is based on a clustering technique applied to cluster similar, neighboring ones of the image segments.

9. The method as recited in claim 1, further comprising:
   repeating for each bounding box that represents a region of the input image, said applying the bounding box as a query, said receiving the query result, and said generating the category histogram for the respective region of the input image.

10. A computing device, comprising:
a memory configured to maintain an input image;
a processor to implement an image representation application that is configured to:
  select bounding boxes that each represent a region of the input image, each of the bounding boxes comprising one or more image segments of the input image;
  generate a saliency map of the input image;
  apply a bounding box as a query on an images database to determine database image regions that match the region of the input image represented by the bounding box;
  augment the query on the images database based on saliency detection of the region of the input image that is represented by the bounding box;
  receive a query result of the database image regions that match the region of the input image; and
  generate a category histogram for the region of the input image based on category labels of each of the database image regions that match the region of the input image.

11. The computing device as recited in claim 10, wherein the image representation application is configured to repeat, for each bounding box that represents a region of the input image, said apply the bounding box as a query augmented based on the saliency detection, and said generate the category histogram for the respective region of the input image.

12. The computing device as recited in claim 10, wherein the category histogram for the region of the input image represents a probability distribution that the region is correctly labeled in the input image.

13. The computing device as recited in claim 10, wherein the image representation application is configured to receive the query result as a ranked list of the database image regions that match the region of the input image based on a visual similarity.

14. The computing device as recited in claim 10, wherein the image representation application is configured to vote for a representative category label of the region of the input image based on the category histogram that is said generated for the region of the input image.

15. The computing device as recited in claim 10, wherein the image representation application is configured to generate the image segments of the input image utilizing an image segmentation technique that over-segments the input image based on appearance features of the input image.

16. A method, comprising:
  selecting bounding boxes that each represent a region of an input image, each of the bounding boxes comprising one or more image segments of the input image;
  generating a saliency map of the input image;
  for each of the bounding boxes that represent a region of the input image:
    applying a bounding box as a query on an images database to determine database image regions that match the respective region of the input image represented by the bounding box, the query augmented based on saliency detection of the respective region of the input image that is represented by the bounding box; and
    generating a category histogram for the respective region of the input image based on category labels of each of the database image regions that match the respective region of the input image.

17. The method as recited in claim 16, wherein the category histogram for the respective region of the input image represents a probability distribution that the region is correctly labeled in the input image.

18. The method as recited in claim 16, further comprising receiving a query result as a ranked list of the database image regions that match the respective region of the input image based on a visual similarity.

19. The computing device as recited in claim 14, wherein the image representation application is further configured to vote for the representative category label of the region of the input image based additionally on segmentation boundaries of the respective database image regions that match the region of the input image.

20. The computing device as recited in claim 19, wherein the image representation application is further configured to refine a boundary of the region of the input image that is represented by the bounding box based on the segmentation boundaries of the respective database image regions that match the region of the input image.

* * * * *